United States Patent
Lee et al.

(10) Patent No.: US 8,889,308 B2
(45) Date of Patent: Nov. 18, 2014

(54) FUEL CELL SYSTEM AND DRIVING METHOD FOR THE SAME

(75) Inventors: Chi-Seung Lee, Yongin-si (KR); Seong-Jin An, Yongin-si (KR); Jin-Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 226 days.

(21) Appl. No.: 12/975,251

(22) Filed: Dec. 21, 2010

(65) Prior Publication Data

US 2012/0028138 A1 Feb. 2, 2012

(30) Foreign Application Priority Data

Jul. 29, 2010 (KR) .................. 10-2010-0073529

(51) Int. Cl.
*H01M 8/04* (2006.01)
(52) U.S. Cl.
USPC .......................................... 429/430; 429/428
(58) Field of Classification Search
None
See application file for complete search history.

(56) References Cited

U.S. PATENT DOCUMENTS

| | | | |
|---|---|---|---|
| 6,635,370 B2 | 10/2003 | Condit et al. | |
| 2002/0081468 A1* | 6/2002 | Shioya | 429/19 |
| 2004/0001980 A1* | 1/2004 | Balliet et al. | 429/13 |
| 2006/0228594 A1 | 10/2006 | Suh | |
| 2009/0169935 A1 | 7/2009 | Manabe et al. | |

FOREIGN PATENT DOCUMENTS

| | | |
|---|---|---|
| JP | 06-333586 | 12/1994 |
| KR | 10-2004-0028767 | 4/2004 |
| KR | 10-0645690 B1 | 11/2006 |
| KR | 10-2008-0059673 | 6/2008 |

OTHER PUBLICATIONS

KIPO Office action dated Apr. 23, 2012, for Korean priority Patent application 10-2010-0073529, (5 pages).

* cited by examiner

*Primary Examiner* — Cynthia K. Walls
(74) *Attorney, Agent, or Firm* — Christie, Parker & Hale, LLP

(57) ABSTRACT

A fuel cell system includes a fuel cell stack that includes a plurality of unit cells, each including a membrane-electrode assembly including an electrolyte membrane, a cathode at one side of the electrolyte membrane, and an anode at an opposite side of the electrolyte membrane, and separators at respective sides of the membrane-electrode assembly, a fuel supply for supplying a fuel to the fuel cell stack, an oxidizing agent supply for supplying an oxidizing agent to the fuel cell stack, and a controller for controlling operation of the fuel supply and the oxidizing agent supply, for measuring a voltage of each of the unit cells, and for turning off a load coupled to the fuel cell stack after determining that the voltages of the unit cells reached a reference voltage.

4 Claims, 4 Drawing Sheets

FUEL CELL SYSTEM AND DRIVING METHOD FOR THE SAME

CROSS-REFERENCE TO RELATED APPLICATION

This application claims priority to and the benefit of Korean Patent Application No. 10-2010-0073529 filed in the Korean Intellectual Property Office on Jul. 29, 2010, the entire contents of which are incorporated herein by reference.

BACKGROUND

1. Field

Embodiments of the present invention relate to a fuel cell system and a driving method thereof.

2. Description of Related Art

A fuel cell is a device that electrochemically generates electric power using a fuel (e.g., hydrogen or a reformed gas) and an oxidizing agent (e.g., oxygen or air), and directly converts the externally supplied fuel (e.g., fuel that is continuously supplied from the outside) and the oxidizing agent to electrical energy by an electrochemical reaction.

As an oxidizing agent of the fuel cell, pure oxygen or air containing a large amount of oxygen is used. As fuel for the fuel cell, fuel containing a large amount of hydrogen that is generated by reforming pure hydrogen or hydrocarbon-based fuel (e.g., LNG, LPG, or CH3OH) is used.

Hereinafter, for better comprehension and ease of description, among fuel cells, a polymer electrolyte membrane fuel cell (PEMFC) is described. The PEMFC has high output density and energy conversion efficiency, and can be operated at a low temperature of 80° C. or lower and can be sealed in a small size, and is thus used as a power source in various fields, such as nonpolluting vehicles, home electricity generation systems, mobile communication equipment, military equipment, and medical equipment.

The above information disclosed in this Background section is only for enhancement of understanding of the background of the invention and, therefore, may contain information that does not form the prior art that is already known in this country to a person of ordinary skill in the art.

SUMMARY

Embodiments of the present invention have been made in an effort to provide a fuel cell system that can reduce or suppress an oxide film from being formed on the surface of a cathode catalyst in an OCV state, and a driving method thereof.

A fuel cell system according to an exemplary embodiment of the present invention includes a fuel cell stack that includes a plurality of unit cells, each including a membrane-electrode assembly including an electrolyte membrane, a cathode at one side of the electrolyte membrane, and an anode at an opposite side of the electrolyte membrane, and separators at respective sides of the membrane-electrode assembly, a fuel supply for supplying a fuel to the fuel cell stack, an oxidizing agent supply for supplying an oxidizing agent to the fuel cell stack, and a controller for controlling operation of the fuel supply and the oxidizing agent supply, for measuring a voltage of each of the unit cells, and for turning off a load coupled to the fuel cell stack after determining that the voltages of the unit cells reached a reference voltage.

The controller may be configured to reduce an amount of current generated from the fuel cell stack while the fuel and the oxidizing agent are supplied and the load is applied.

The controller may be configured to control an amount of the fuel supplied to the fuel cell stack to reduce the amount of current generated from the fuel cell stack.

The load may include an auxiliary load applied to consume oxygen of the cathode when the driving of the fuel cell stack is terminated.

The load may also include a main load for receiving electric energy generated from the fuel cell stack, wherein the controller is configured to turn off the main load and to apply the auxiliary load when the driving of the fuel cell stack is terminated.

The reference voltage may be 0V.

The controller may be configured to control supply of the oxidizing agent to the fuel cell stack.

The fuel cell system may further include a reformer for reforming the fuel supplied to the fuel cell stack.

The fuel cell system may further include a humidifying unit for humidifying the fuel supplied to the fuel cell stack.

A driving method of a fuel cell system according to another exemplary embodiment of the present invention includes reducing an amount of current generated from a fuel cell stack when a load is applied, blocking an oxidizing agent supplied to the fuel cell stack, and turning off the load after determining that voltages of all unit cells of the fuel cell stack have reached a reference voltage.

Said reducing the amount of current generated from the fuel cell stack may include controlling an amount of fuel supplied to the fuel cell stack.

The driving method may further include supplying a fuel and the oxidizing agent while reducing the amount of current generated from the fuel cell stack.

The reference voltage may be 0V.

Oxygen in the fuel cell stack may be depleted prior to turning off the load.

A driving method of a fuel cell system according to another exemplary embodiment of the present invention includes turning off a first load for receiving electric energy generated from a fuel cell stack, applying a second load to consume oxygen at a cathode of the fuel cell stack when driving of the fuel cell stack is terminated, blocking an oxidizing agent supplied to the fuel cell stack, and turning off the second load after determining that voltages of all unit cells in the fuel cell stack have reached a reference voltage.

The driving method may further include supplying a fuel and the oxidizing agent while turning off the first load and applying the second load.

The reference voltage may be 0V.

Applying the second load may reduce an amount of oxide film formed at the cathode of the fuel cell stack.

In the OCV state, an oxide film can be suppressed from being formed on the surface of the cathode catalyst, and the life span of the fuel cell can be extended.

DETAILED DESCRIPTION

Figure 1:
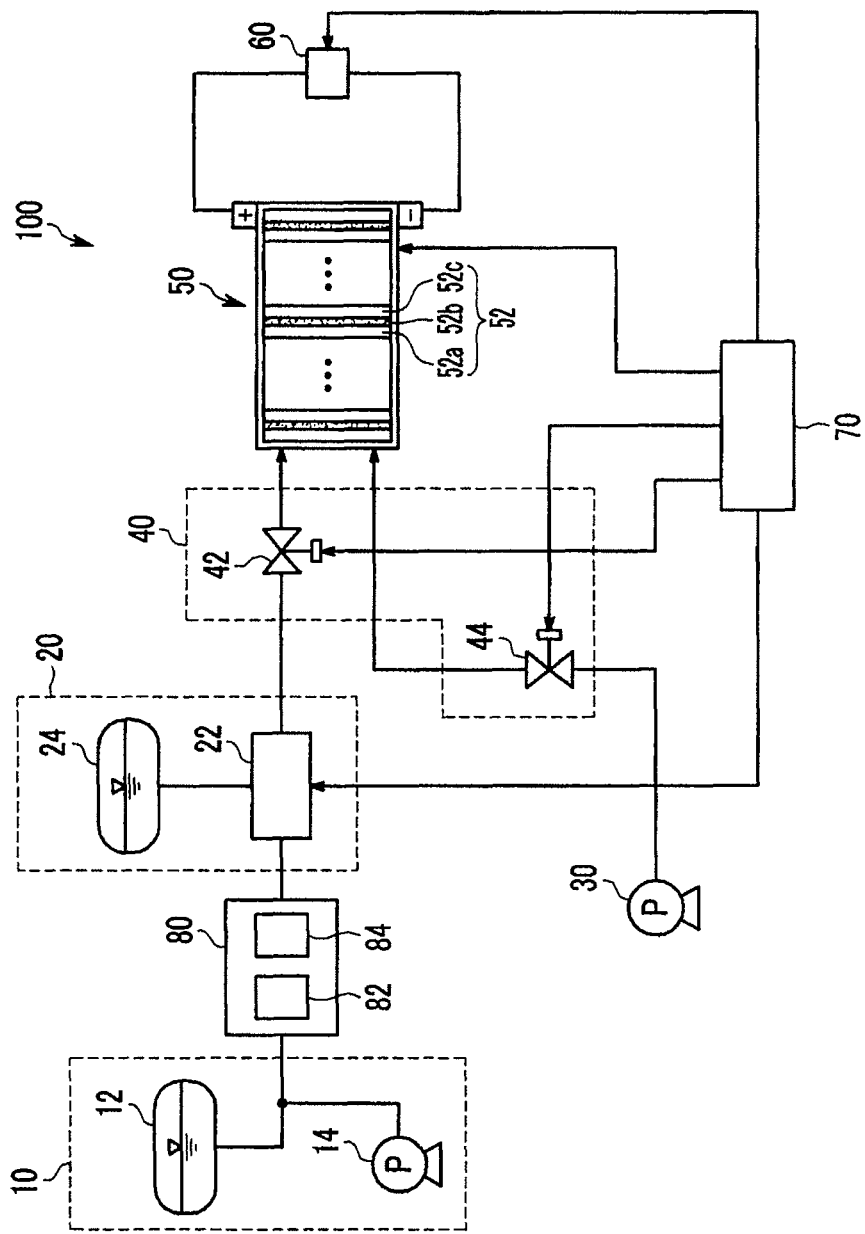
FIG. 1 is a block diagram of a configuration of a fuel cell system according to an exemplary embodiment of the present invention.

The life-span of the fuel cell greatly depends on a rate of deterioration of a membrane electrode assembly (MEA). The deterioration of the MEA may depend on a structure and/or a driving condition of the fuel cell stack, and one cause of deterioration of the MEA is an oxide film formed at a cathode catalyst surface in an open circuit voltage (OCV) state.

Hereinafter, exemplary embodiments of the present invention will be described more fully with reference to the accompanying drawings, in which exemplary embodiments of the invention are shown. As those skilled in the art will realize, the described embodiments may be modified in various different ways, all without departing from the spirit or scope of the present invention.

Further, in a plurality of exemplary embodiments, like reference numerals are used for components having the same configuration in a first exemplary embodiment, and configurations different from the first exemplary embodiment are described in the other exemplary embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through one or more additional elements. In addition, unless explicitly described to the contrary, the word "comprise," and variations thereof, such as "comprises" or "comprising," will be understood to imply the inclusion of stated elements but not the exclusion of any other elements.

FIG. 1 is a block diagram of a configuration of a fuel cell system according to an exemplary embodiment of the present invention.

Referring to FIG. 1, a fuel cell system 100 may be a polymer electrode membrane fuel cell (PEMFC) that generates hydrogen by reforming a fuel and generates electric energy through electrochemical reaction of the hydrogen and oxygen.

However, the present invention is not limited thereto, and the fuel cell system 100 according to the exemplary embodiment of the present invention may use liquid or gas fuel that contains hydrogen, such as methanol, ethanol, LPG, LNG, gasoline, and butane gas. For example, a fuel cell stack 50 according to one exemplary embodiment of the present invention may be formed using a direct oxidation fuel cell (DMFC) method that generates electric energy through direction reaction of the liquid or gas fuel and oxygen.

The fuel used in the fuel cell system 100 may be a hydrocarbon-based fuel in a liquid or gas state, such as natural gas, LPG, and the like. In addition, the fuel cell system 100 may use oxygen, which may be stored in an additional storage means (e.g., a storage tank), or air as an oxidizing agent.

The fuel cell system 100 includes a fuel supply 10, a humidifying unit 20, an oxidizing agent supply 30, a supply amount controller 40, a fuel cell stack 50, and a controller 70. The fuel cell system 100 is coupled to a load 60, and is configured to provide electric energy to the load 60.

The fuel supply 10 supplies a fuel to the fuel cell stack 50. The fuel supply 10 includes a fuel tank 12 and a fuel pump 14. In the present embodiment, the fuel tank 12 stores a liquid fuel, and the fuel pump 14 is coupled to the fuel tank 12 and supplies the liquid fuel stored in the fuel tank 12 using a pumping force (e.g., a predetermined pumping force) therefrom.

The humidifying unit 20 includes a humidifier 22 and a moisture supply 24. The humidifier 22 is coupled to the fuel tank 12 and humidifies the liquid fuel emitted from the fuel tank 12. The amount of humidification of the humidifier 22 is controlled by the controller 70. The moisture supply 24 is coupled to the humidifier 22 to supply moisture thereto.

The oxidizing agent supply 30 supplies an oxidizing agent to the fuel cell stack 50. The oxidizing agent supply 30 includes an oxidizing agent pump. The oxidizing agent pump takes in external air using a pumping force (e.g., a predetermined pumping force).

The supply amount controller 40 includes a fuel control valve 42 and an oxidizing agent control valve 44. The fuel control valve 42 is between the humidifying unit 20 and the fuel cell stack 50, and supplies a humidified fuel to the fuel cell stack 50. The controller 70 controls the degree of opening of the fuel control valve 42, and accordingly, the amount of humidified fuel supply (e.g., the amount of humidified fuel supplied to the fuel cell stack 50) is controlled. The oxidizing agent control valve 44 is provided between the oxidizing agent supply 30 and the fuel cell stack 50, and supplies the oxidizing agent to the fuel cell stack 50. The controller 70 controls the degree of opening of the oxidizing agent control valve 44, and accordingly, the amount of oxidizing agent supplied (e.g., to the fuel cell stack 50) is controlled.

The fuel cell stack 50 includes a plurality of unit cells that generates electric energy by inducing an oxidation/reduction reaction between the fuel and the oxidizing agent. One unit cell 52 among the plurality of unit cells includes a membrane electrode assembly (MEA) 52b, which performs oxidization/reduction on the fuel and oxygen from the oxidizing agent, and separators (also referred to as bipolar plates) 52a and 52c for supplying the fuel and the oxidizing agent to the MEA 52b. The unit cell 52 has a structure in which the two separators 52a and 52c are located at respective sides of the MEA 52b. The MEA 52b includes an electrolyte membrane at the center thereof, a cathode at one side of the electrolyte membrane, and an anode at the other side of the electrolyte membrane. The oxidizing agent is supplied to the separators 52a and 52c through the cathode, and the fuel is supplied to the anode. The fuel cell system 100 according to one exemplary embodiment of the present invention includes a fuel cell stack 50 where the unit cells 52 are continuously arranged.

The load 60 is electrically coupled to a positive (+) terminal and a negative (−) terminal of the fuel cell stack 50, and consumes electric energy generated from the fuel cell stack 50. The load 60 may include one or more of various electric devices such as a motor, an inverter that converts direct current DC to alternating current AC, and domestic electric heating equipment.

The controller 70 controls operation of the humidifying unit 20, the supply amount controller 40, the fuel cell stack 50, and the load 60. In further detail, when the driving of the fuel cell stack 50 is terminated, the controller 70 decreases the amount of current generated from the fuel cell stack 50 while maintaining the supply of (e.g., while continuously supplying) the fuel and the oxidizing agent to the fuel cell stack 50. In addition, the controller 70 stops the oxidizing agent supply after an amount of time (e.g., a predetermined time) has elapsed to decrease a voltage of the fuel cell stack 50. The controller 70 measures a voltage of each of the plurality of unit cells to determine a point in time at which the voltages of the unit cells (e.g., all of the unit cells) reach a reference voltage level (e.g., a predetermined voltage level, for example 0V), and then turns off the load 60.

The fuel cell system 100 according to the present exemplary embodiment includes a reformer 80 that generates a reformed gas using a fuel. The reformer 80 is located between the fuel supply 10 and the humidifying unit 20. The reformer 80 is a device that not only transforms the liquid gas to a hydrogen gas for electricity generation by the fuel cell stack 50 through a reforming reaction, but also reduces the concentration of carbon monoxide contained in the hydrogen gas. In general, the reformer 80 includes a reforming unit 82 that generates a hydrogen gas by reforming a liquid fuel, and a reducing unit 84 that reduces the concentration of carbon monoxide in the hydrogen gas. The reforming unit 82 transforms the fuel to hydrogen-rich reformed gas with a catalyst reaction, such as reformation of water vapor and a partial oxidation or exothermic reaction. The carbon monoxide reducing unit 84 reduces the concentration of carbon monoxide in the reformed gas with a catalyst reaction, such as a water-gas conversion method and a selective oxidation method, or a method such as refinement of hydrogen using a separation film. In the present exemplary embodiment, the reformer 80 and the humidifying unit 20 are separated, but the reformer 80 may include the humidifying unit 20 in other embodiments.

The fuel cell stack 50 is influenced by deterioration of the MEA 52*b*. The deterioration of the MEA 52*b* may be caused by an oxide film that is formed on a cathode catalyst surface in an open circuit voltage (OCV) state that occurs after termination of operation. In general, the oxide film is formed in a condition when oxygen exists and a voltage higher than a reference level (e.g., a predetermined level, for example, 0.6V) is present, and may also be formed in the OCV state that occurs after the termination of driving of the fuel cell stack 50. For example, the OCV may be close to 1.2V, and the forming of oxide film is further increased as the duration of the OCV state is increased. The performance of the fuel cell stack 50 is not significantly deteriorated by the oxide film formed in a relatively short period of time, but the oxide film formed due to a long time operation (e.g., over time), or frequent ON/OFF (e.g., frequently switching the fuel cell stack 50 on and off), may significantly deteriorate performance of the fuel cell stack 50.

In the present exemplary embodiment, when the driving of the fuel cell stack 50 is terminated, oxygen remaining in the fuel cell stack 50 is used up such that the voltages of all the unit cells become 0V and then the load 60 is turned off. For this, the amount of current generated from the fuel cell stack 50 is reduced, and the oxidizing agent supply is blocked to decrease the voltage. In addition, the voltages of the respective unit cells are measured, and the load 60 is turned off after determining a point in time at which the measured voltages reach 0V. The load 60 is not directly turned off at the driving termination time of the fuel cell stack 50. For example, the load 60 is 300 W during the driving period of the fuel cell stack 50, and the load 60 is decreased (e.g., gradually decreased) to 0 W from 300 W for an amount of time (e.g., a predetermined time period), rather than directly changed to 0 W at the time at which driving of the fuel cell stack 50 is terminated. Hereinafter, a detailed description of the present exemplary embodiment will be described with reference to FIG. 2.

Figure 2:
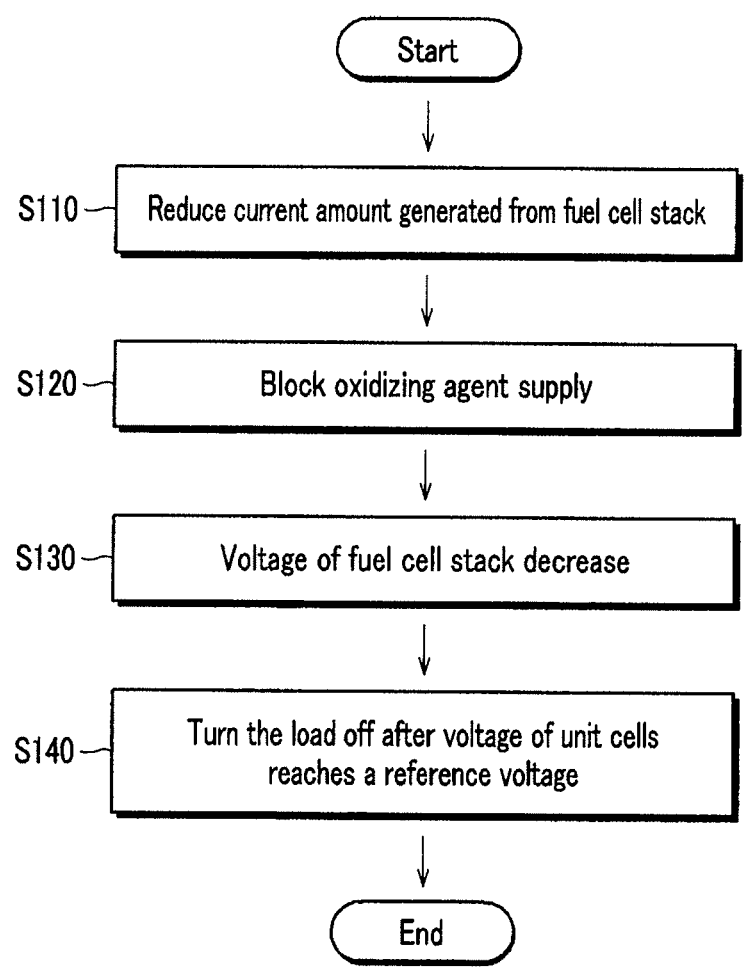
FIG. 2 is a flowchart of a driving method of the fuel cell system according to the exemplary embodiment of the present invention shown in FIG. 1.

FIG. 2 is a flowchart of a driving method of the fuel cell system according to the exemplary embodiment of the present invention shown in FIG. 1.

Referring to FIG. 2, the controller 70 reduces the amount of current generated from the fuel cell stack 50 (S110). The controller 70 can reduce the amount of current generated from the fuel cell stack 50 by controlling the amount of fuel supplied to the anode. In this case, the controller 70 controls the fuel control valve 42 and the oxidizing agent control valve 44 to continuously supply the fuel and the oxidizing agent to the fuel cell stack 50. The fuel and the oxidizing agent should be of an amount required to reduce the amount of current generated from the fuel cell stack 50 to a desired amount of current (e.g., a predetermined amount of current). If no fuel is supplied to the fuel cell stack 50, a reverse voltage may be generated. The reverse voltage may cause a cathode catalyst loss.

The controller 70 blocks the supply of the oxidizing agent after an amount of time (e.g., a predetermined time) elapses in consideration of a reaction speed of the fuel cell stack 50 (S120). In general, the reaction speed of the fuel cell stack 50 is proportional to the amount of current, and inversely proportional to the number of electrons participating the reaction. The controller 70 closes the oxidizing agent control valve 44 after the elapsing of a time (e.g., a predetermined time period) during which the generated current amount is decreased (e.g., decreased to a predetermined current amount) according to the reaction speed of the fuel cell stack 50. In this case, the controller 70 blocks the fuel supply unless the amount of fuel lacks compared to the amount of oxidizing agent supplied to the fuel cell stack 50.

While the supply of the oxidizing agent is blocked, the voltage of the fuel cell stack 50 is decreased (S130). When the oxidizing agent is not supplied to the cathode while the load 60 is applied, the voltage of the fuel cell stack 50 is decreased to 0V. When the oxidizing agent supply is blocked while the load 60 is applied, the voltage of the fuel cell stack 50 is not decreased lower than 0V, theoretically.

The controller 70 determines a point in time at which the voltages of the unit cells (e.g., all of the unit cells) of the fuel cell stack 50 reach 0V, and then turns off the load 60 (S140).

As described, the oxygen in the cathode is consumed (e.g., depleted) by controlling the amount of current generated from the fuel cell stack 50, and the load 60 is turned off while the voltages of the unit cells (e.g., all of unit cells) reach 0V so that the oxide film can be prevented from being formed at the cathode catalyst surface in the OCV state.

Figure 3:
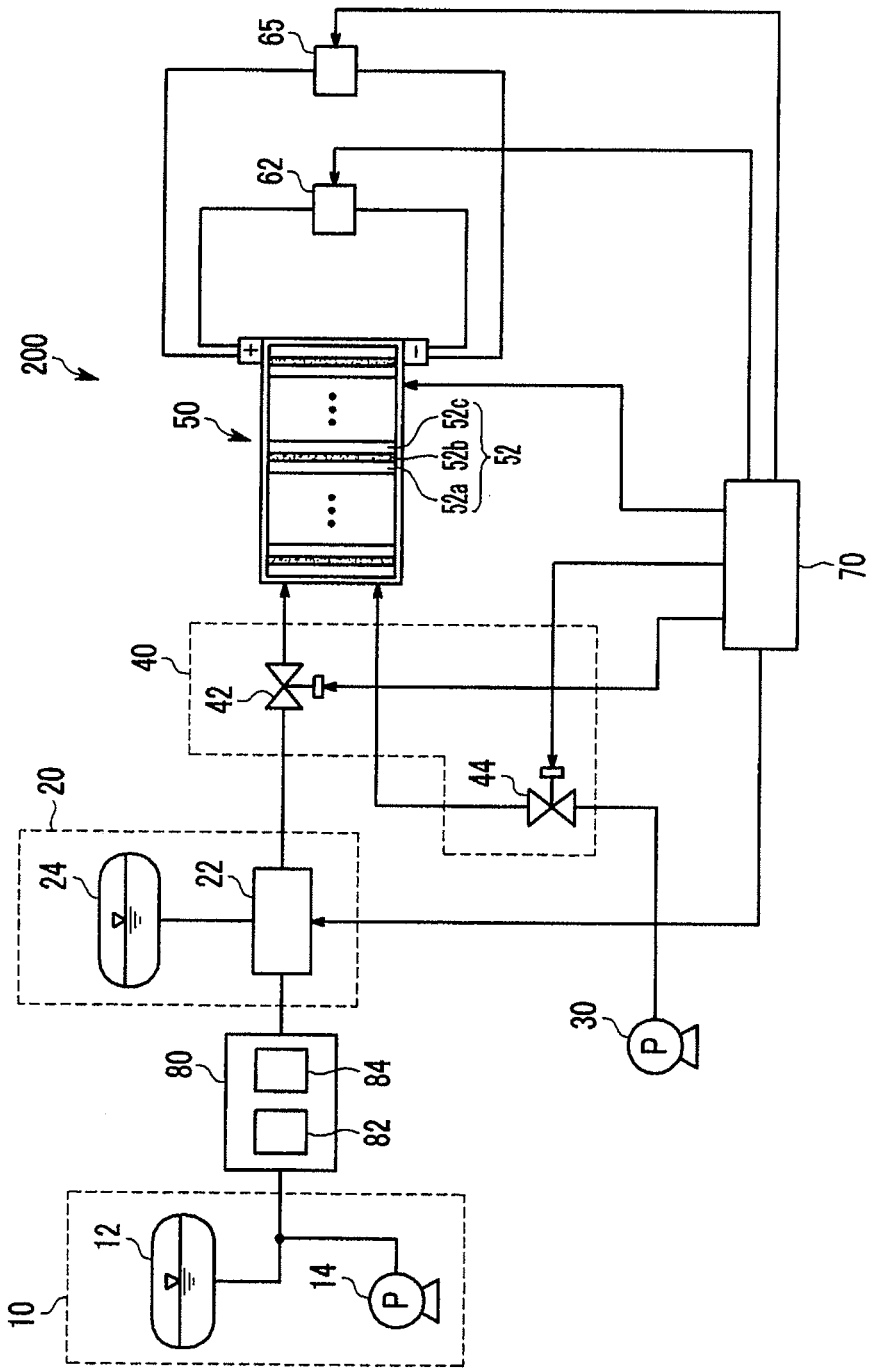
FIG. 3 is a block diagram schematically showing a configuration of a fuel cell system according to another exemplary embodiment of the present invention.

FIG. 3 is a schematic block diagram of a configuration of a fuel cell system according to another exemplary embodiment of the present invention.

Referring to FIG. 3, a fuel cell system 200 according to the present exemplary embodiment includes a fuel supply 10, a humidifying unit 20, an oxidizing agent supply 30, a supply amount controller 40, a fuel cell stack 50, and a controller 70. A load (e.g., a main load) 62 and an auxiliary load 65 are coupled to the fuel cell system 200, and receive electrical energy therefrom. The fuel cell system 200 of the present exemplary embodiment, when compared to the fuel cell system 100 according to the previous exemplary embodiment shown in FIG. 1, is further coupled with the auxiliary load 65.

When the driving of the fuel cell stack 50 is terminated, the auxiliary load 65 is applied to the fuel cell stack 50 so as to prevent an oxide film from being formed at a cathode catalyst surface in the OCV state. The auxiliary load 65 is electrically coupled to positive (+) and negative (−) terminals of the fuel cell stack 50. When the driving of the fuel cell stack 50 is terminated, the auxiliary load 65 is applied to consume (e.g., depleted) oxygen in a cathode of the fuel cell stack 50 and to cause the voltages of the unit cells (e.g., all of the unit cells) reach 0V.

The controller 70 controls operation of each of the humidifying unit 20, the supply amount controller 40, the fuel cell stack 50, the load 62, and the auxiliary load 65. In further detail, the controller 70 turns off the load 62 and applies the auxiliary load 65 (e.g., turns on the auxiliary load 65) when the driving of the fuel cell stack 50 is terminated. Further, the controller 70 continuously applies a fuel and an oxidizing agent to the fuel cell stack 50. The controller 70 blocks the oxidizing agent supply and decreases the voltage of the fuel cell stack 50 after an amount of time (e.g., a predetermined time period) has elapsed. The controller 70 determines a point in time at which voltages of the unit cells (e.g., all of the unit cells) reach a reference voltage level (e.g., a predetermined voltage level, for example 0V) by measuring the voltage of each of the plurality of unit cells, and then turns off the auxiliary load 65.

In the second exemplary embodiment (i.e., the present exemplary embodiment), the load 62 is turned off first, and then the auxiliary load 65 is applied when the driving of the fuel cell stack 50 is terminated. In addition, the auxiliary load 65 is turned off after oxygen remaining in the fuel cell stack 50 is consumed to make the voltages of unit cells (e.g., all of the unit cells) reach 0V. Unlike the load 60 of the first exemplary embodiment, the load 62 of the second exemplary embodiment is directly turned off at the time driving of the fuel cell stack 50 is terminated. For example, the load 62 is 300 W while the fuel cell stack 50 is being driven, and the load 62 directly becomes 0 W at the point of termination of driving the fuel cell stack 50. Hereinafter, a detailed description of the second exemplary embodiment of the present invention will be described with reference to FIG. 4.

Figure 4:
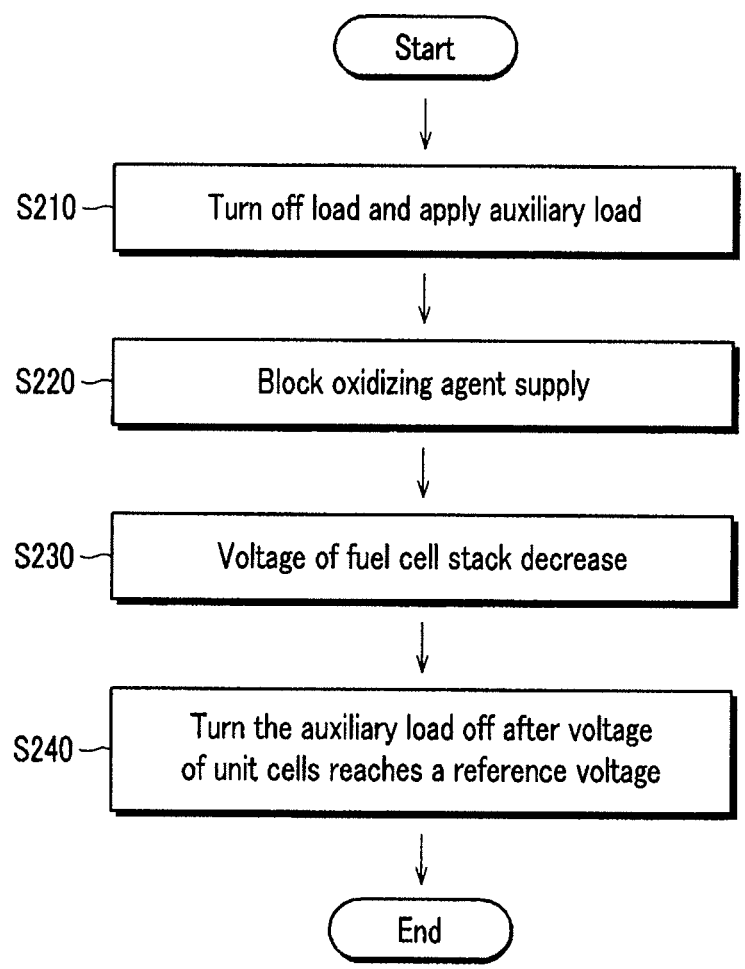
FIG. 4 is a flowchart of a driving method of the fuel cell system according to the exemplary embodiment of the present invention shown in FIG. 3.

FIG. 4 is a flowchart of a driving method of the fuel cell system according to the second exemplary embodiment of the present invention.

Referring to FIG. 4, the controller 70 turns off the load 62 in the fuel cell stack 50 and applies the auxiliary load 65 (S210). In this case, the controller 70 controls a fuel control valve 42 and an oxidizing agent control valve 44 for continuous supply of the fuel and the oxidizing agent to the fuel cell stack 50. At the termination of driving the fuel cell stack 50, oxygen may be compulsively consumed by applying an electric load from an external source. In this case, the amount of fuel in the anode may lack due to excessive electric load so that a reverse voltage may be generated. The reverse voltage should not be generated because it may cause a cathode catalyst loss. The auxiliary load 65 is of a size (e.g., a predetermined size electric load) that does not generate a reverse voltage.

The controller 70 blocks the oxidizing agent supply after an amount of time (e.g., a predetermined time period) has elapsed in consideration of a reaction speed of the fuel cell stack 50 (S220). The controller 70 closes the oxidizing agent control valve 44 after the elapsing of a time period (e.g., a predetermined time period) during which the amount of current generated from the fuel cell stack 50 is reduced (e.g., to a predetermined amount of current) as the auxiliary load 65 is applied. In this case, the controller 70 blocks the supply of the fuel when the amount of fuel is sufficient compared to the amount of oxidizing agent supplied to the fuel cell stack 50.

While the supply of the oxidizing agent is blocked, a voltage of the fuel cell stack 50 is decreased (S230). While the auxiliary load 65 is applied, the voltage of the fuel cell stack 50 is gradually decreased to 0V when the oxidizing agent is not supplied to the cathode.

The controller 70 turns off the auxiliary load 65 after determining a point in time at which voltages of unit cells (e.g., all of the unit cells) of the fuel cell stack 50 reach a reference voltage level (e.g., a predetermined voltage level, such as 0V) (S240).

As described, when oxygen in the cathode of the fuel cell stack 50 is consumed by applying the auxiliary load 65, and the voltages of all the unit cells reach 0V, the load is turned off to thereby prevent the oxide film from being formed on the surface of the cathode catalyst in the OCV state.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it will be appreciated to those skilled in the art that various modifications are made and other equivalent embodiments are available. Accordingly, the actual scope of the present invention must be determined by the spirit and scope of the appended claims, and their equivalents.

DESCRIPTION OF SOME OF THE REFERENCE NUMERALS 100, 200: fuel cell system
10: fuel supply
20: humidifying unit
30: oxidizing agent supply
40: supply amount controller
50: fuel cell stack
60, 62: load
65: auxiliary load
70: controller
80: reformer

What is claimed is:

1. A driving method of a fuel cell system, the method comprising:
    using a controller to reduce an amount of current generated from a fuel cell stack by controlling a degree of opening of a fuel control valve to control an amount of fuel supplied to the fuel cell stack when a load is applied;
    using the controller to block an oxidizing agent supplied to the fuel cell stack; and
    using the controller to control the load wattage to turn off the load by gradually decreasing the load after determining that voltages of all of unit cells of the fuel cell stack have reached a reference voltage.

2. The driving method of claim 1, further comprising supplying the fuel and the oxidizing agent while reducing the amount of current generated from the fuel cell stack prior to blocking an oxidizing agent supplied to the fuel cell stack.

3. The driving method of claim 1, wherein the reference voltage is 0V.

4. The driving method of claim 1, wherein oxygen in the fuel cell stack is depleted prior to turning off the load.

* * * * *